United States Patent
Mihara et al.

(10) Patent No.: US 8,050,150 B2
(45) Date of Patent: Nov. 1, 2011

(54) NEAR-FIELD LIGHT DETECTION ELEMENT AND INFORMATION REPRODUCING MEDIUM REPRODUCING METHOD

(75) Inventors: Takashi Mihara, Hyogo (JP); Masahiro Birukawa, Osaka (JP)

(73) Assignee: Panasonic Corporation, Osaka (JP)

( * ) Notice: Subject to any disclaimer, the term of this patent is extended or adjusted under 35 U.S.C. 154(b) by 54 days.

(21) Appl. No.: 12/598,329

(22) PCT Filed: Mar. 3, 2009

(86) PCT No.: PCT/JP2009/000950
§ 371 (c)(1),
(2), (4) Date: Oct. 30, 2009

(87) PCT Pub. No.: WO2009/110222
PCT Pub. Date: Sep. 11, 2009

(65) Prior Publication Data
US 2010/0118666 A1    May 13, 2010

(30) Foreign Application Priority Data

Mar. 3, 2008 (JP) .................................. 2008-051938

(51) Int. Cl.
*G11B 11/00* (2006.01)
(52) U.S. Cl. .................................................... 369/13.33
(58) Field of Classification Search ........................ None
See application file for complete search history.

(56) References Cited

U.S. PATENT DOCUMENTS

| | | | |
|---|---|---|---|
| 6,600,714 B2 * | 7/2003 | Ichimura et al. ........... | 369/275.1 |
| 6,649,894 B2 | 11/2003 | Matsumoto et al. | |
| 7,106,664 B2 * | 9/2006 | Hasegawa et al. ......... | 369/13.33 |
| 7,529,158 B2 | 5/2009 | Matsumoto et al. | |
| 2003/0066944 A1 * | 4/2003 | Matsumoto et al. ....... | 250/201.3 |
| 2004/0085862 A1 | 5/2004 | Matsumoto et al. | |
| 2006/0160209 A1 * | 7/2006 | Larson et al. ............... | 435/287.2 |
| 2007/0064544 A1 * | 3/2007 | Okamoto .................... | 369/13.33 |
| 2007/0194357 A1 * | 8/2007 | Oohashi et al. ............. | 257/292 |
| 2009/0008735 A1 * | 1/2009 | Ogino et al. ................. | 257/436 |
| 2009/0207703 A1 | 8/2009 | Matsumoto et al. | |

FOREIGN PATENT DOCUMENTS

| | | |
|---|---|---|
| JP | 10-79137 | 3/1998 |
| JP | 2001-291264 | 10/2001 |
| JP | 2002-25102 | 1/2002 |
| JP | 2003-114184 | 4/2003 |
| JP | 2003-149694 | 5/2003 |
| JP | 2004-151046 | 5/2004 |

OTHER PUBLICATIONS

International Search Report issued Jun. 9, 2009 in International (PCT) Application No. PCT/JP2009/000950.

* cited by examiner

*Primary Examiner* — Joseph Feild
*Assistant Examiner* — Henok Heyi
(74) *Attorney, Agent, or Firm* — Wenderoth, Lind & Ponack, L.L.P.

(57) ABSTRACT

A near-field light detection element is provided with a light source, a conductive scatterer for generating near-field light by being irradiated with light from the light source, and a photoelectric conversion element arranged in a near-field light generation region near the scatterer. The scatterer irradiates near-field light to a recording medium, and the near-field light detection element detects an intensity change of the near-field light generated by a change of the dielectric constant of the recording medium based on an electrical conductivity change of the photoelectric conversion element.

14 Claims, 9 Drawing Sheets

NEAR-FIELD LIGHT DETECTION ELEMENT AND INFORMATION REPRODUCING MEDIUM REPRODUCING METHOD

TECHNOLOGICAL FIELD

The present invention relates to a near-field light detection element for reproducing information from an information recording medium, whose dielectric constant changes according to information to be recorded, using near-field light and an information recording medium reproducing method.

BACKGROUND ART

With the progress of the information technology field, there has been a demand to increase the capacities of optical memories such as CDs (compact discs), DVDs and BD (Blu-ray discs). By present optical recording methods, it is difficult to reduce the size of recording marks any further due to optical diffraction limit. In recent years, a great deal of attention is paid to an optical recording method using near-field light as technology for breaking through this diffraction limit. This near-field light is light locally generated near an aperture or fine particles of the size equal to or shorter than the wavelength of the light when the light is incident on these aperture or fine particles, and the spread of the near-field light does not depend on the wavelength of the incident light, but is determined by the size of an object on which the light is incident.

Conventionally, many methods for causing light to be incident on a sharp-pointed fiber probe or the like and generating near-field light at a micro-aperture formed at the leading end of the fiber probe or the like have been employed, but there has been a problem that light utilization efficiency in relation to incident light is poor. In recent years, a near-field light generating element utilizing a surface plasmon resonance of metal has been proposed as technology for drastically improving this light utilization efficiency (see, for example, patent literatures 1 and 2). These technologies are for inducing a surface plasmon resonance by irradiating a very small metal film with light having a suitable wavelength and generating near-field light near the metal film for recording and reproduction.

Figure 17:
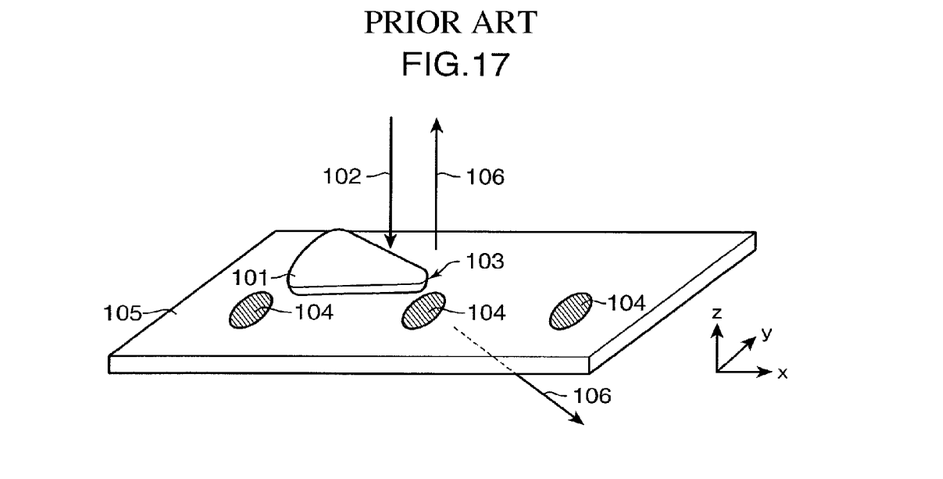
FIG. 17 is a diagram showing a conventional reproducing head.

A conventional reproducing method as described above is described with reference to FIG. 17. As shown in FIG. 17, light 102 polarized in x direction is incident on a fan-shaped and electrically conductive scatterer 101 from a positive side toward a negative side in z direction. Here, a suitable wavelength is selected as the wavelength of the incident light, a surface plasmon resonance is induced in the scatterer 101 and near-field light is generated near an apex 103. An information recording medium 105 recorded with recording marks 104 is brought closer to a region of the scatterer 101 where the near-field light is generated, and is relatively moved while maintaining a constant distance. At this time, an intensity change of scattered light 106 is detected based on a difference in the relative positional relationship of the scatterer 101 and the recording marks 104, whereby information can be reproduced. Such a reproducing method is the one using the principle of so-called near field optical microscope.

What is problematic here is a S/N ratio at the time of reproduction. In other words, the scattered light 106 to become a reproduction signal is obtained by converting a part of the near-field light generated near the apex 103 of the scatterer 101 into propagation light by the information recording medium 105 and is difficult to efficiently introduce to a light receiving element. Thus, detectable light intensity is generally weak.

There is a method for increasing the intensity of the incident light 102 in order to increase the intensity of the scattered light 106. However, particularly in the case of using a rewritable material as a recording material of the information recording medium 105, there is a limit in increasing the intensity of the incident light 102 to prevent changes of the recording marks 104 by the near-field light at the time of reproduction.

In order to improve the S/N ratio, it has been also proposed to eliminate the influence of a part of the incident light 102 deviated from the scatterer 101 and directly reflected by the information recording medium 105, for example, by providing a light shielding film around the scatterer 101 or by providing a luminous body for emitting light having a wavelength different from that of the incident light 102 in a region of the scatterer 101 where near-field light is generated. Any of these methods is similar to the above in detecting a change of the propagation light resulting from the near-field light and cannot drastically increase signal intensity.

Patent Literature 1: Japanese Unexamined Patent Publication No. 2003-114184
Patent Literature 2: Japanese Unexamined Patent Publication No. 2003-149694

SUMMARY OF THE INVENTION

An object of the present invention is to provide a near-field light detection element and an information recording medium reproducing method capable of ensuring a high S/N ratio at the time of reproduction by directly detecting an intensity change of near-field light near a scatterer as a change of electrical conductivity of a photoelectric conversion element.

One aspect of the present invention is directed to a near-field light detection element for reproducing information from an information recording medium, whose dielectric constant changes according to information to be recorded, using near-field light, comprising a light source; a conductive scatterer for generating near-field light upon being irradiated with light emitted from the light source; and a photoelectric conversion element arranged in a near-field light generation region near the scatterer, wherein the scatterer irradiates the information recording medium with the near-field light; and an intensity change of the near-field light generated by a change of the dielectric constant of the information recording medium is detected based on an electrical conductivity change of the photoelectric conversion element.

In this near-field light detection element, the information recording medium whose dielectric constant changes according to information to be recorded is irradiated with the near-field light, the photoelectric conversion element is arranged in the near-field light generation region near the scatterer and the intensity change of the near-field light generated due to a change of the dielectric constant of the information recording medium is detected based on the electrical conductivity change of the photoelectric conversion element. Thus, the photoelectric conversion element is directly exposed to the near-field light, whereby an output change of the near-field light can be directly detected and a high S/N ratio can be ensured at the time of reproduction.

DETAILED DESCRIPTION OF THE INVENTION

Hereinafter, one embodiment of the present invention is described with reference to the drawings. Same or similar elements are identified by same or similar reference numerals and are not described in some cases in the following description relating to the drawings.

Figure 1:
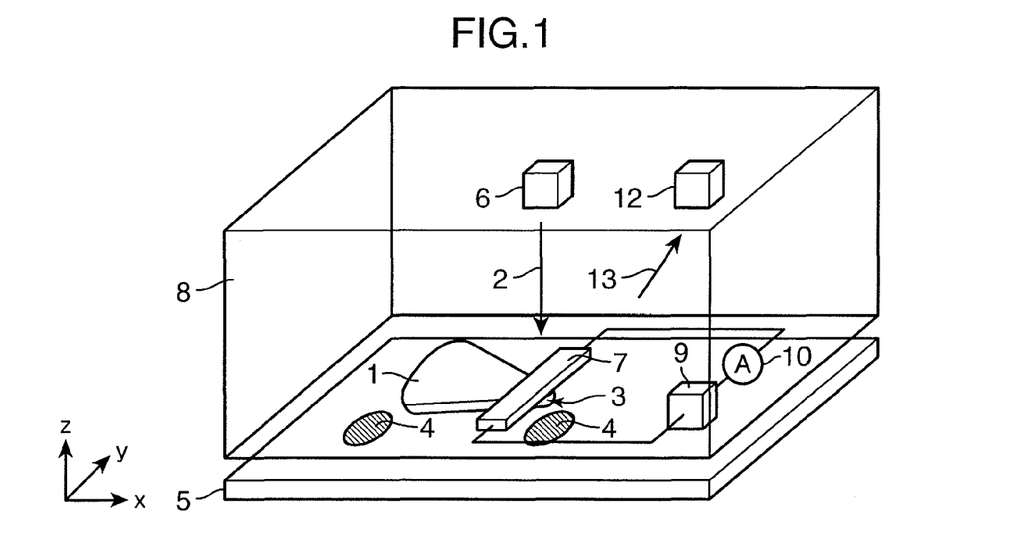
FIG. 1 is a perspective view showing a schematic construction of a reproducing head according to one embodiment of the invention.
Figure 2:
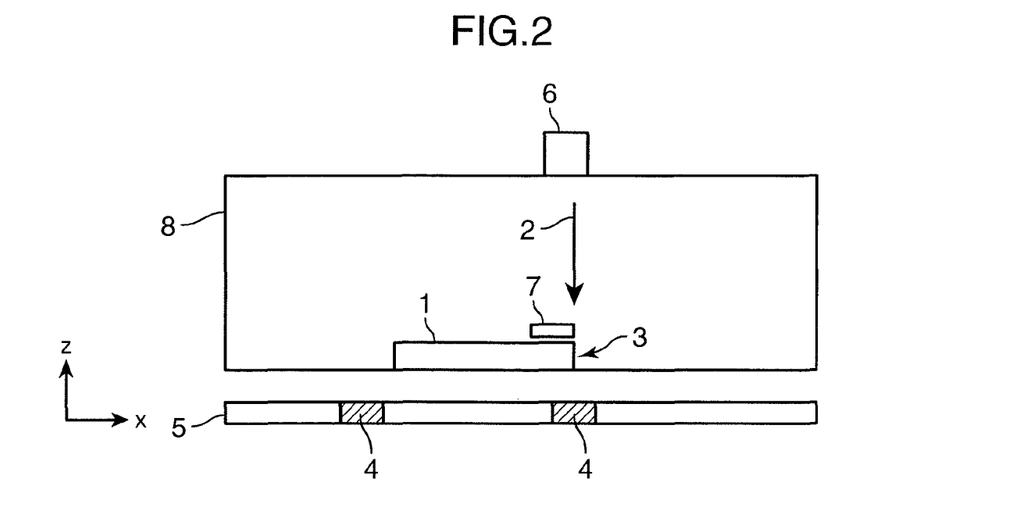
FIG. 2 is a section of the reproducing head when viewed in y direction shown in FIG. 1.

The mode of a reproducing head as a near-field light detection element according to the embodiment of the present invention is described with reference to FIGS. 1 and 2. FIG. 1 is a perspective view showing a schematic construction of the reproducing head according to the embodiment of the invention, and FIG. 2 is a section of the reproducing head when viewed in y direction shown in FIG. 1. In FIG. 2, a power supply 9, a current detection element 10, a control unit 12 and reflected light 13 are not shown to facilitate the description. This point similarly holds for the other drawings to be described later.

As shown in FIG. 1, the reproducing head of this embodiment is provided with an electrically conductive scatterer 1, a light source 6 such as a semiconductor laser, a photoelectric conversion element 7 disposed in a region where near-field light of the scatterer 1 is generated (near-field light generation region), a transparent substrate 8 for bearing the scatterer 1 and the like, the power supply 9 for causing a current to flow in the photoelectric conversion element 7, the current detection element 10 for detecting the current flowing in the photoelectric conversion element 7, and the control unit 12 for executing a control to keep a distance between the scatterer 1 and a recording medium 5 constant and other controls.

Incident light 2 emitted from the light source 6 passes through a condensing element (not shown) such as a lens and reaches the scatterer 1 via the transparent substrate 8, wherein the transparent substrate 8 functions as a light guide member for introducing the light emitted from the light source 6 to the scatterer 1. Here, in the case of arranging the scatterer 1 and the photoelectric conversion element 7 near a light emitting surface of the light source 6, the condensing element and the transparent substrate 8 become unnecessary. When the recording medium 5 as an information recording medium is made of a rewritable material, the intensity of the incident light 2 needs to be appropriately adjusted in order to prevent the erasure of recording marks 4 by near-field light to be described later.

The light source 6 irradiates the incident light 2 polarized in x direction to the scatterer 1, thereby generating near-field light of constant intensity near the scatterer 1. Simultaneously, a constant bias voltage is applied from the power supply 9 to the photoelectric conversion element 7 and the scatterer 1 is brought closer to the recording medium 5 already recorded with the recording marks 4, thereby relatively moving the scatterer 1 in x direction with respect to the recording medium 5 while maintaining a constant distance.

Since the quantity of the reflected light 13 from the lower surface of the transparent substrate 8 sensitively changes according to a distance between the reproducing head (scatterer 1) and the recording medium 5, the distance between the scatterer 1 and the recording medium 5 can be kept constant by monitoring the total reflected light quantity using a photodetector in the control unit 12 and feeding the monitoring result back to a control circuit in the control unit 12. A control method for the distance between the scatterer 1 and the recording medium 5 is not particularly limited to the above example, and another control method may be employed.

At this time, in the recording medium 5, a dielectric constant on the recording medium 5 changes according to information to be recorded, i.e. according to the position of the recording mark 4, and the intensity of the near-field light generated by the scatterer 1 changes due to this change of the dielectric constant. Accordingly, the intensity of the near-field light changes due to a difference in a relative positional relationship of the scatterer 1 and the recording mark 4. On the other hand, since the electrical conductivity of the photoelectric conversion element 7 changes according to an intensity change of the near-field light, the recording mark 4 can be detected by detecting this electrical conductivity change as a change of a current flowing in the photoelectric conversion element 7 using the current detection element 10, whereby information can be reproduced at a high S/N ratio from the recording medium 5.

In this embodiment, as shown in FIG. 2, the scatterer 1 and the photoelectric conversion element 7 are embedded in the transparent substrate 8 such that the surfaces of both the transparent substrate 8 and the scatterer 1 toward the recording medium 5 are located on the same plane. In this way, the abrasion of the scatterer 1 can be prevented.

Next, the scatterer 1 is described in more detail. The scatterer 1 is so shaped as to narrow its width toward the apex 3 where the near-field light is generated and, specifically, a fan-shaped film in which a bisector of the central angle of the apex 3 is aligned with x direction. If light having a suitable wavelength and polarized in x direction is incident on this scatterer 1, surface plasmon is induced on the surface of the scatterer 1, whereby near-field light particularly strong near the apex 3 of the scatterer 1 can be generated. Here, the near-field light generation region near the scatterer 1 is, for example, a region within 100 nm from the scatterer 1, preferably a region within 50 nm from the scatterer 1 and more preferably a region within 40 nm from the scatterer 1.

A semiconductor material whose dielectric constant at the wavelength of the incident light 2 has a negative real part is preferable as the material of the scatterer 1 in inducing a surface plasmon resonance. For example, materials such as Au, Ag, Al, Pt, Cu, Mo, Ni, Mg and Ir are preferable since real parts of their dielectric constants in a frequency band from visible light to infrared light are negative and a semiconductor laser can be used as a light source.

Since the real parts of the dielectric constants of these metallic materials are positive in an ultraviolet region or a frequency band lower than the ultraviolet region and these materials behave as ordinary dielectric bodies in response to light, no plasmon resonance occurs. Further, since a relationship between wavelength and frequency of the plasmon resonance is substantially equal to that of propagation light in a frequency band from a mid-infrared region to a far-infrared region or higher, a light localization effect and a light enhancing effect decrease. In view of the above, the wavelength of the incident light is preferably from 400 nm to 2 μm and more preferably from 500 nm to 1 μm.

The spread of the near-field light generated as described above is determined not by the wavelength of the incident light, but by the shape and dimensions of the scatterer 1. In this embodiment, the spread of the near-field light depends on the tip diameter (diameter) of the apex 3 of the scatterer 1 in the form of a fan-shaped film and it is preferable to set the tip diameter shorter than the wavelength of the incident light and more preferable to set the tip diameter equal to or shorter than 10 nm. In this case, a near-field light spot equal to or below a diffraction limit can be formed and the output of the near-field light can be increased. Depending on the dimensions of the apex 3 of the scatterer 1 in the form of a fan-shaped film, it is also possible to output near-field light whose intensity is several hundreds to several thousands times higher than that of the incident light 2.

It is sufficient for the scatterer 1 to have such a shape with an apex for generating near-field light. The shape is preferably narrowed, for example, toward one apex, but is not limited to the fan shape described here. For example, a rod shape having the same width toward one apex may be employed, but a shape narrowed toward one apex has an effect of spreading a wavelength region where the plasmon resonance occurs. Further, it is preferable in generating near-field light with a smaller spread to maximally sharply point the apex for generating the near-field light.

In order to efficiently generate near-field light in the scatterer 1, it is preferable to conform a polarization direction of the incident light 2 to a direction of the bisector of the central angle of the apex 3 of the scatterer 1, i.e. to x direction and confirm the wavelength of the incident light 2 to a frequency satisfying a surface plasmon resonance condition determined by the material, shape and dimensions of the scatterer 1 and dielectric constants of surrounding substances. Unless there is any light source having such a wavelength as to satisfy the surface plasmon resonance condition, the material, shape and dimensions of the scatterer 1 and the dielectric constants of the surrounding substances may be, conversely, so adjusted as to satisfy the resonance condition at a desired wavelength.

Next, the photoelectric conversion element 7 is described in detail. The photoelectric conversion element 7 is preferably a material whose electrical conductivity changes according to the intensity of irradiation light, i.e. a semiconductor material whose electrical conductivity changes according to an intensity change of near-field light. For example, if the wavelength of the incident light 2 is 630 nm, InSb, PbSe, PbTe, InAs, Ge, GaSb, Si, InP, GaAs, CdTe, AlSb, CdSe and the like whose wavelength at an absorption end is 630 nm or longer can be used.

The photoelectric conversion element 7 is preferably made of a material which is substantially transparent at the wavelength of the incident light 2 and can absorb the incident light 2 by a multiple photon absorption process (e.g. two-photon absorption process). Here, it means a light absorptance of 5% or below, preferably 1% or below to be substantially transparent. For example, if the wavelength of the incident light 2 is 630 nm, GaP, CdS, ZnS, $Fe_2O_3$, $Cu_2O_3$, $In_2O_3$, $WO_3$, $Fe_2TiO_3$, PbO, $V_2O_5$, $FeTiO_3$, $Bi_2O_3$, $Nb_2O_3$, $TiO_2$, $SrTiO_3$, ZnO, $BaTiO_3$, $CaTiO_3$, $KTaO_3$, $SnO_2$ and the like whose wavelength at an absorption end lies from 315 nm to 630 nm are effectively used. In this case, the electrical conductivity changes only in a part of the photoelectric conversion element 7 where light intensity is strong. In other words, since the electrical conductivity changes only due to an intensity change of the strong near-field light by the scatterer 1, it becomes insusceptible to components of the incident light 2 directly incident on the photoelectric conversion element 7 and background light such as weak scattered light and reflected light and a reduction of an S/N ratio at the time of reproduction can be prevented.

Since the intensity of the near-field light changes due to a difference in the relative positional relationship of the scatterer 1 and the recording mark 4 as described above, optical carrier density induced in the photoelectric conversion element 7 accordingly changes, with the result that the electrical conductivity changes. Thus, if a constant bias voltage is applied to the opposite ends of the photoelectric conversion element 7 made of the above material by the power supply 9, it is possible to detect a change of the electrical conductivity as a change of the current by the current detection element 10 and reproduce information.

If the photoelectric conversion element 7 is made of a highly conductive material, the generation of the near-field light by the scatterer 1 may be possibly suppressed. In such a case, the scatterer 1 and the photoelectric conversion element 7 may be spaced apart by a specified distance as shown in FIG. 2.

A region where the photoelectric conversion element 7 is formed is preferably only in the near-field light generation region of the scatterer 1. Specifically, it is preferable to form the photoelectric conversion element 7 within 30 nm from the scatterer 1 and more preferable to form the photoelectric conversion element 7 within 10 nm from the scatterer 1. For example, to be within 30 nm from the scatterer 1 means that a shortest distance between the scatterer 1 and the photoelectric conversion element 7 is 30 nm or shorter. In this case, out of light irradiated to the photoelectric conversion element 7, the intensity of the near-field light from the scatterer 1 is highest and it can be prevented that light other than the near-field light, i.e. components of the incident light 2 directly irradiated to the photoelectric conversion element 7 and those of the incident light 2 deviated from the scatterer 1 and irradiated to something other than the scatterer 1 (e.g. recording medium 5) to be scattered become background light to reduce the S/N ratio at the time of reproduction.

Next, a relationship between a distance between the scatterer 1 and the recording medium 5 and a reproduction signal is described in detail. The shorter the distance between the scatterer 1 and the recording medium 5, the larger the interaction of the near-field light and the recording mark 4 and, accordingly, the larger the intensity change of the near-field light. Thus, it is preferable to arrange the scatterer 1 and the recording medium 5 proximate to each other in obtaining a high S/N ratio at the time of reproduction. However, as this distance becomes shorter, it leads to not only difficulty to keep this distance constant, but also a possibility of changing the recording marks 4 and unrecorded parts by the near-field light at the time of reproduction. Therefore, the distance between the scatterer 1 and the recording medium 5 may be appropriately determined in consideration of a necessary S/N ratio and characteristics of the recording medium 5.

An electromagnetic field analysis was conducted using an FDTD method (finite difference time domain method) to obtain a light intensity change near the scatterer 1 when a single recording mark was actually relatively moved with respect to the scatterer 1. First of all, this analytical model is described with reference to FIG. 3.

Figure 3:
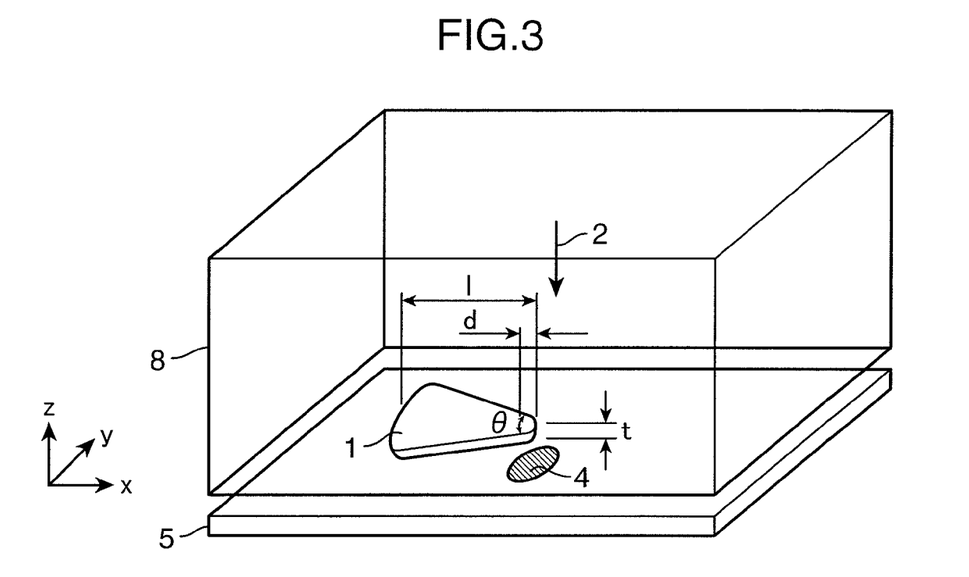
FIG. 3 is a perspective view showing a schematic construction of an analytical model of the reproducing head used to obtain a light intensity change near a scatterer.

As shown in FIG. 3, the scatterer 1 is fan-shaped and (I, d, θ, t)=(100 nm, 10 nm, 60°, 30 nm) if I, d, θ and t denote the radius, tip diameter, central angle and thickness of the scatterer 1. The scatterer 1 is embedded in the transparent substrate 8 such that surfaces of the scatterer 1 and the transparent substrate 8 toward a −z side are located on the same plane. The thickness of the recording medium 5 was 20 nm and a distance between the recording medium 5 and the scatterer 1 was 5 nm. The recording mark 4 was embedded in the recording medium 5 and had a cylindrical shape, and the diameter thereof was 20 nm and the thickness thereof was the same as that of the recording medium 5, i.e. 20 nm.

The materials of the scatterer 1, the transparent substrate 8 and the recording medium 5 were respectively gold, $SiO_2$, a GeSbTe phase-change material in an amorphous state, and the recording mark 4 was made of GeSbTe in a crystalline state. An x-axis is aligned with a direction of the bisector of the central angle of the fan shape of the scatterer 1 and, out of apices of the fan shape of the scatterer 1, a point located most at a +z side was defined as an origin of an x-coordinate, a y-coordinate and a z-coordinate.

The incident light 2 was a plane wave having a wavelength of 830 nm and polarized in x direction and was incident in a direction from the positive side toward the negative side in z direction. L was defined to be a straight line obtained by parallelly moving the x-axis 3 nm in +z direction. In other words, the straight line L passes a position 3 nm above the surface of the scatterer 1 at the +z side, and the lower surface of the photoelectric conversion element 7 at the −z side that serves as a light receiving surface is located along this straight line L.

Figure 4:
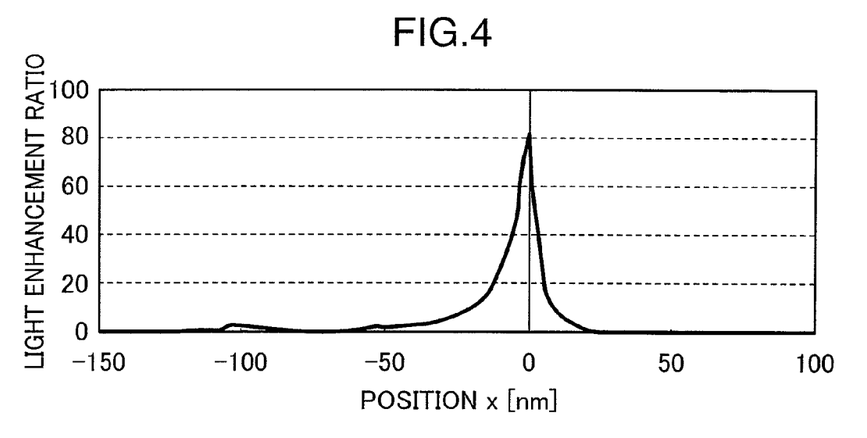
FIG. 4 is a graph showing a light enhancement ratio on a straight line L when no recording mark is present.

On the above conditions, a light enhancement ratio on the straight line L when no recording mark is present (corresponding to a case where the recording mark 4 is located at infinity) is first shown in FIG. 4. Here, the light enhancement ratio is a ratio of light intensity to incident light intensity. It can be understood from FIG. 4 that strong light intensity resulting from near-field light is obtained particularly near the apex (position x=0 nm) of the scatterer 1.

Figure 5:
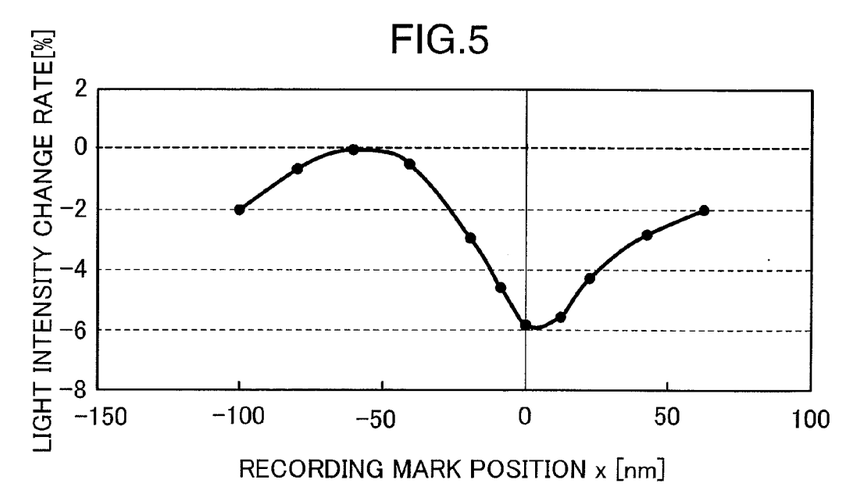
FIG. 5 is a graph showing a change rate of light intensity at point P on the straight line L.

Next, there is thought a change of the light intensity on the straight line L when the recording medium 5 formed with the single recording mark 4 is moved in x direction. During the movement of the recording medium 5, the central position (centers of circles of ±z surfaces) of the single recording mark 4 moves in a direction from a negative side toward a positive side in x direction in a range (x, y)=(−100 nm, 0 nm) to (60 nm, 0 nm). FIG. 5 is a graph showing a change of the light intensity at a point (point P) on the straight line L where x=−1 nm during the movement of the recording medium 5. In FIG. 5, a horizontal axis represents an x-direction position coordinate of the center of the recording mark 4 and a vertical axis represents a change rate of the light intensity at the point P when the recording mark 4 is located at each point to the light intensity at the point P when no recording mark is present.

It can be understood from FIG. 5 that a modulation rate of the light intensity at the point P by the recording mark 4 is highest when the x-coordinate of the center of the recording mark 4 coincides with the apex of the scatterer 1 (recording mark position x=0 nm) and about 6%. This is equivalent to a change amount which is about five times as much as the intensity of the incident light 2. Thus, if the photoelectric conversion element 7 is arranged near the point P, a signal as shown in FIG. 5 can be obtained by a change of the current flowing in the photoelectric conversion element 7. It is assumed that the change of the electrical conductivity of the photoelectric conversion element 7 is proportional to the light intensity and changes of the intensity and distribution of the near-field light caused by the presence of the photoelectric conversion element 7 are not considered.

Figure 6:
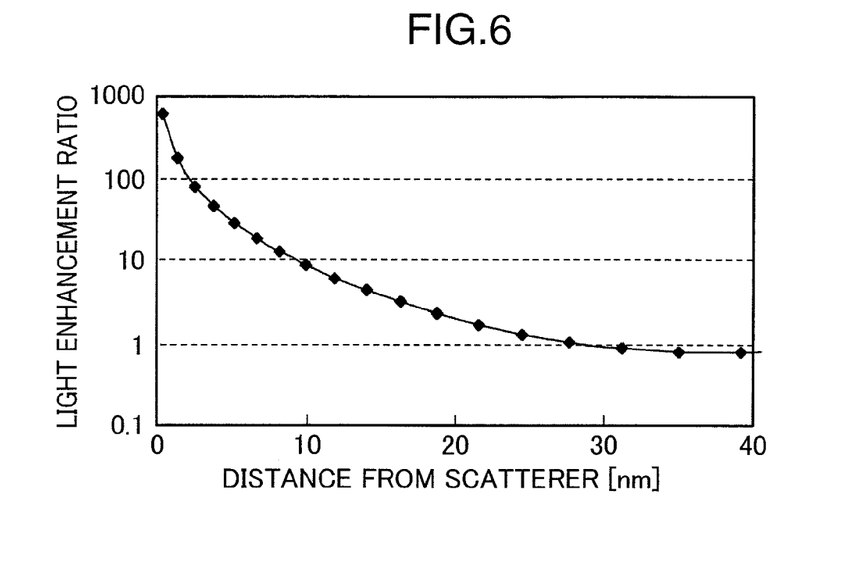
FIG. 6 is a graph showing a light enhancement ratio on an x-axis when no recording mark is present.
Figure 7:
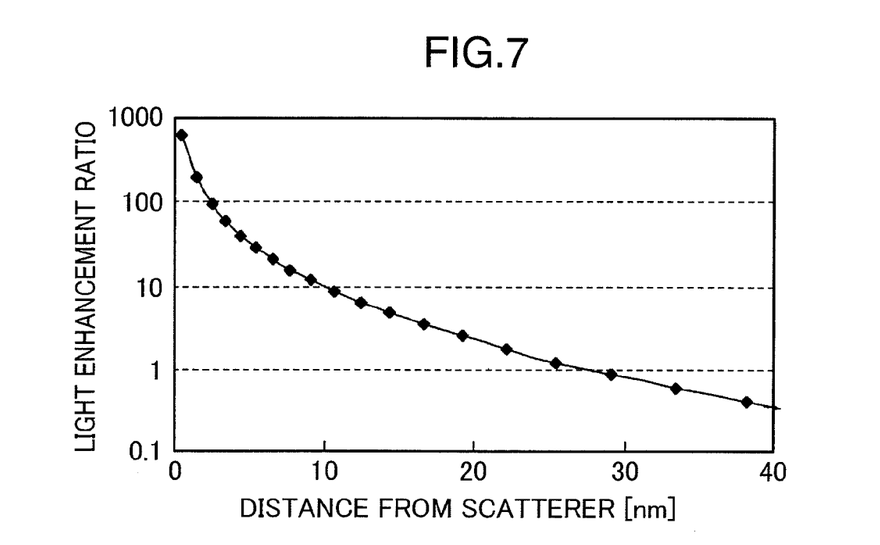
FIG. 7 is a graph showing light enhancement ratio on a z-axis when no recording mark is present.

Next, the region where the photoelectric conversion element 7 is arranged is described. Light enhancement ratios along the x-axis and z-axis when no recording mark 4 is present are respectively shown in FIGS. 6 and 7. It can be understood from FIGS. 6 and 7 that the near-field light intensity is higher than the incident light intensity in a region within 30 nm from the scatterer 1 both in x direction and in z direction. Thus, in this case, it is preferable to arrange the photoelectric conversion element 7 such that a shortest distance between the photoelectric conversion element 7 and the scatterer 1 is equal to or shorter than 30 nm in order to prevent a reduction of the S/N ratio caused by light other than the near-field light.

As described above, in this embodiment, a change of near-field light caused by a difference of the relative positional relationship between the scatterer 1 and the recording mark 4 can be directly detected as a change of the electrical conductivity of the photoelectric conversion element 7 by providing the photoconductive photoelectric conversion element 7 in the region near the scatterer 1, i.e. where the near-field light is generated. This method is a more direct detection method and can improve the S/N ratio of a reproduction signal in that near-field light having stronger signal intensity than propagation light can be dominantly detected as compared with the prior art. Further, a reproduction optical system for introducing the propagation light to the light receiving element becomes unnecessary, which largely contributes to a cost reduction of the reproducing head.

Although the photoelectric conversion element 7 is located closer to the light source 6 than the scatterer 1 in the above embodiment, a case where the photoelectric conversion element 7 is located closer to the recording medium 5 than the scatterer 1 can also be thought. Also in the case where the photoelectric conversion element 7 was located closer to the recording medium 5 than the scatterer 1, the modulation of the light intensity by the recording mark 4 was analyzed by the same FDTF method similar to the above. In this example, M was defined to be a straight line obtained by parallelly moving the x-axis −32 nm in z direction. In other words, the straight line M passes a position about 2 nm below the surface of the scatterer 1 at the −z side and the upper surface of the photoelectric conversion element 7 at the +z side that serves as the light receiving surface is located along this straight line M.

Figure 8:
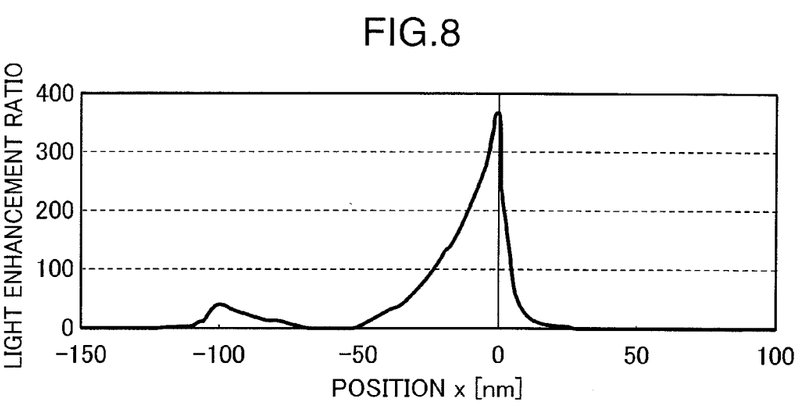
FIG. 8 is a graph showing a light enhancement ratio on a straight line M when no recording mark is present.

First of all, a light enhancement ratio on the straight line M when no recording mark 4 is present is shown in FIG. 8. It can be understood from FIG. 8 that strong light intensity resulting from near-field light is obtained near the apex (x=0 nm) of the scatterer 1 also when the photoelectric conversion element 7 is located closer to the recording medium 5 than the scatterer 1.

Figure 9:
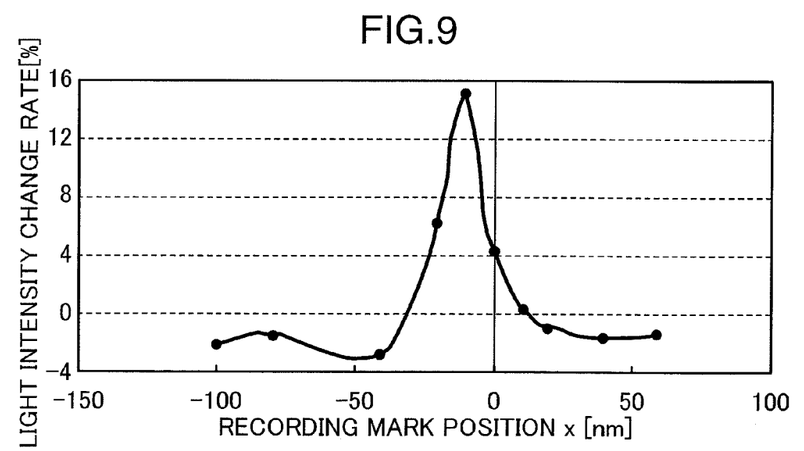
FIG. 9 is a graph showing a change rate of light intensity at point Q on the straight line L.

FIG. 9 shows a change rate of light intensity at a point Q when the point Q was set at a point x=−18 nm on the straight line M and the single recording mark 4 was moved from a negative side toward a positive side in x direction in a range (x, y)=(−100 nm, 0 nm) to (60 nm, 0 nm) as the recording medium 5 was moved to light intensity at the point Q when no recording mark was present. It can be understood from FIG. 9 that the light intensity at the point Q was modulated by up to about 16%. This is equivalent to a change amount which is twenty times as much as the intensity of the incident light 2. Thus, if the photoelectric conversion element 7 is arranged near the point Q, a signal as shown in FIG. 9 should be obtained by a change of the current flowing in the photoelectric conversion element 7. It is assumed that the change of the resistance of the photoelectric conversion element 7 is proportional to the light intensity and changes of the intensity and distribution of the near-field light caused by the presence of the photoelectric conversion element 7 are not considered.

Figure 10:
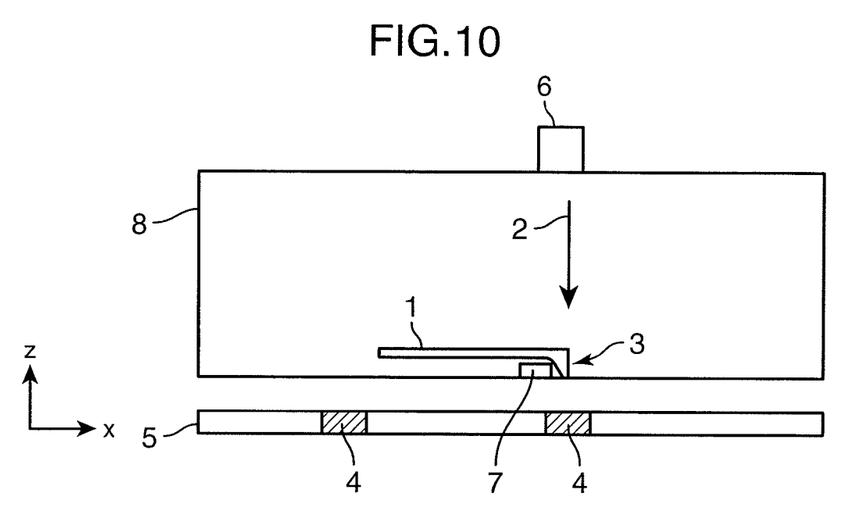
FIG. 10 is a section showing a schematic construction of a reproducing head in which a photoelectric conversion element is provided at a side of the scatterer toward a recording medium.

When the photoelectric conversion element 7 is arranged closer to the recording medium 5 than the scatterer 1 as described above, the construction of a reproducing head as shown in FIG. 10 can be, for example, employed. In the construction shown in FIG. 10, the scatterer 1 is substantially in the form of a flat plate having an apex 3 for generating near-field light, and a part thereof other than the vicinity of the apex 3 is scraped off in a thickness direction of the scatterer 1, and the photoelectric conversion element 7 is arranged in a space including the part of the scatterer 1 scraped off in the thickness direction.

Specifically, a region of the scatterer 1 other than the apex 3 is scraped off toward the transparent substrate 8 and the photoelectric conversion element 7 is arranged in the region including this scraped-off part. Thus, it is possible not only to prevent the abrasion of the photoelectric conversion element 7 during the movement of the recording medium 5, but also to more three-dimensionally sharply point the apex 3 of the scatterer 1 and form a smaller near-field light spot. It is preferable to form a recess in a specified part of the scatterer 1 other than the vicinity of the apex 3 for generating the near-field light and arrange the photoelectric conversion element 7 in the recess in this way.

Figure 11:
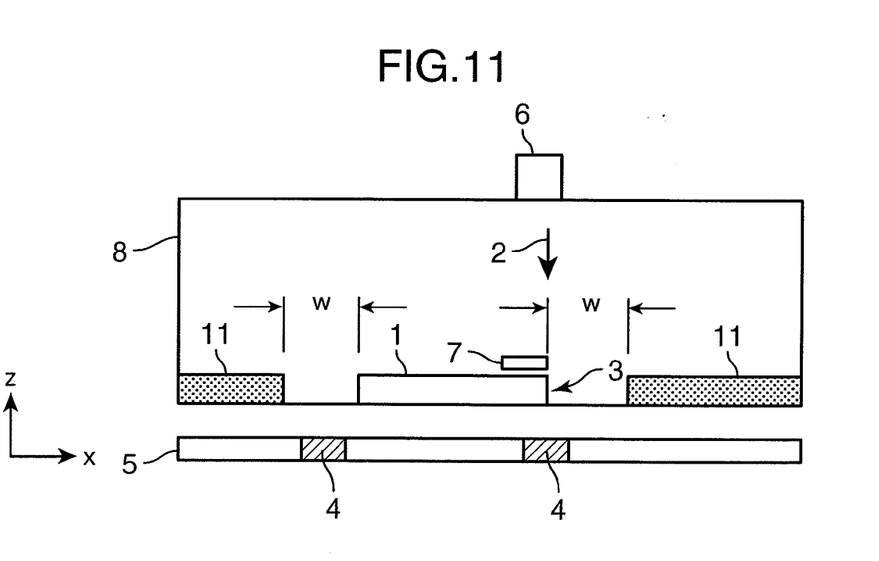
FIG. 11 is a section showing a schematic construction of a reproducing head in which a light shielding layer for absorbing incident light is provided around a scatterer and a photoelectric conversion element.

The construction of the reproducing head is not particularly limited to the above example. For example, if a light shielding film 11 for absorbing incident light 2 is provided around the scatterer 1 and the photoelectric conversion element 7 as shown in FIG. 11, the influence of background light can be reduced more. In other words, it can be prevented that a part of the incident light 2 directly irradiated to the recording medium 5 and reflected thereby becomes background light to reduce the S/N ratio. Here, in order to prevent the irradiation of the incident light 2 to the recording medium 5, it is preferable to set a shortest distance w between the scatterer 1 and the light shielding film 11 and a shortest distance w between the photoelectric conversion element 7 and the light shielding film 11 equal to or shorter than the wavelength of the incident light 2.

Here, the light shielding film 11 preferably includes a material for absorbing the incident light 2. Absorption means that the absorptance of the incident light 2 by the light shielding film is 80% or higher, preferably 90% or higher. For example, if the wavelength of the incident light 2 is 630 nm, InSb, PbSe, PbTe, InAs, Ge, GaSb, Si, InP, GaAs, CdTe, AlSb, CdSe and the like whose wavelength at an absorption end is 630 nm or longer can be used. The light shielding film can be a thin film obtained by thinning a material including any of these materials by a method such as sputtering or a thin film obtained by dispersing fine particles including any of these materials in a carrier made of resin or the like.

Figure 12:
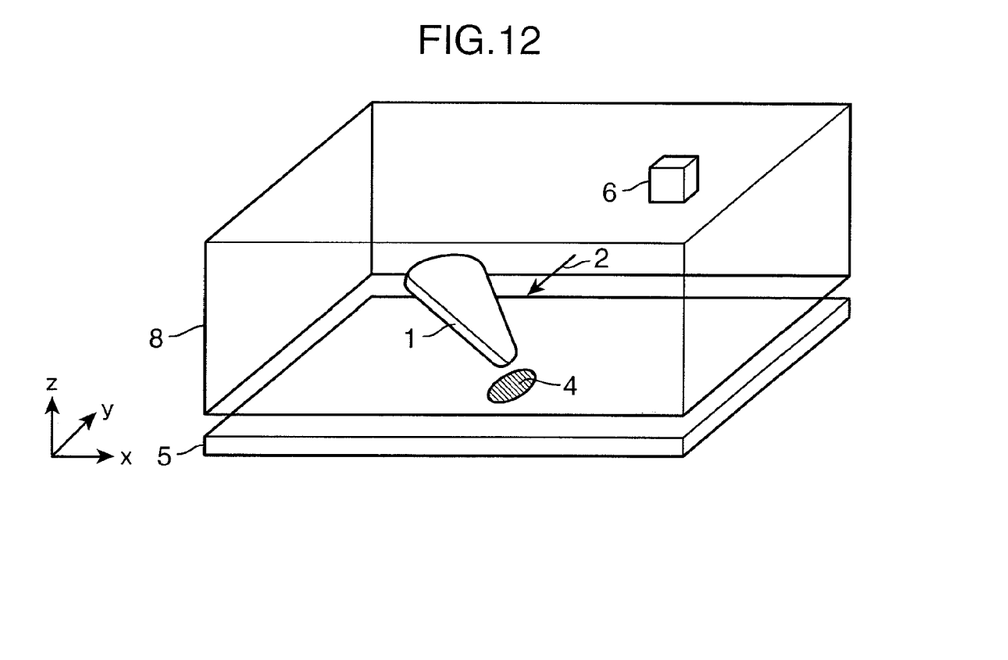
FIG. 12 is a section showing a schematic construction of a reproducing head in which a film surface direction of a scatterer is inclined with respect to a recording medium.

A film surface direction of the scatterer 1 needs not necessarily be parallel to the recording medium 5 and may be inclined with respect to the recording medium 5, for example, as shown in FIG. 12. In this case, if the scatterer 1 is so arranged that the apex 3 for generating near-field light is closest to the recording medium 5, it can be prevented that near-field light generated in a part of the scatterer 1 other than the apex 3 changes the recording medium. At this time, the polarization direction of the incident light 2 is preferably aligned with the direction of the bisector of the central angle of the apex 3 of the scatterer 1 in generating strong near-field light with a small spread. An incidence direction of the incident light 2 may be aligned with the film thickness direction of the scatterer 1.

Figure 13:
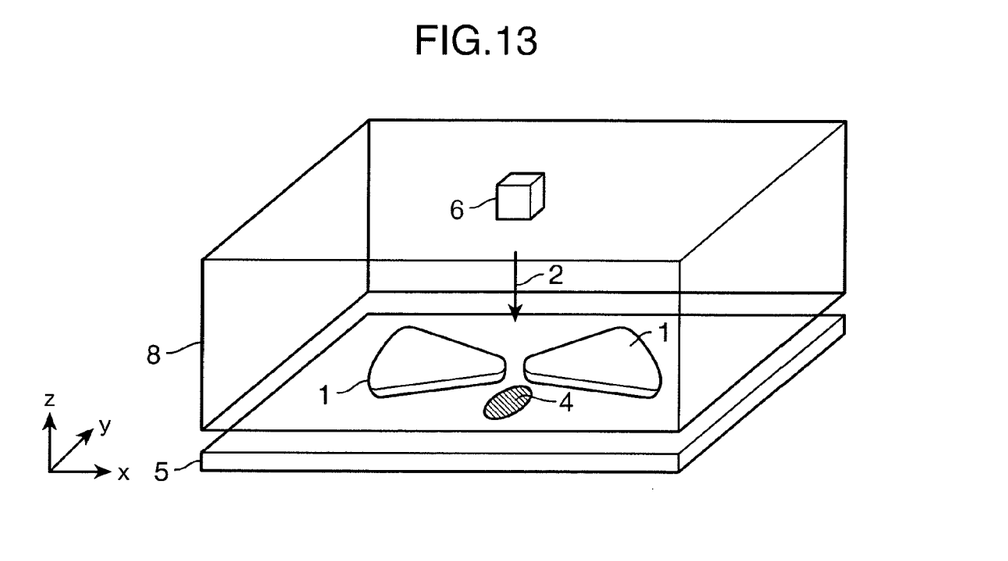
FIG. 13 is a perspective view showing a schematic construction of a reproducing head in which two identically shaped scatterers are provided to face each other.

Not only one scatterer 1, but also a plurality of scatterers 1 can be used. For example, if two identically shaped scatterers 1 are arranged such that apices of fan shapes face each other as shown in FIG. 13, stronger near-field light with a smaller spread can be generated by electromagnetic interaction of the both scatterers 1.

Figure 14:
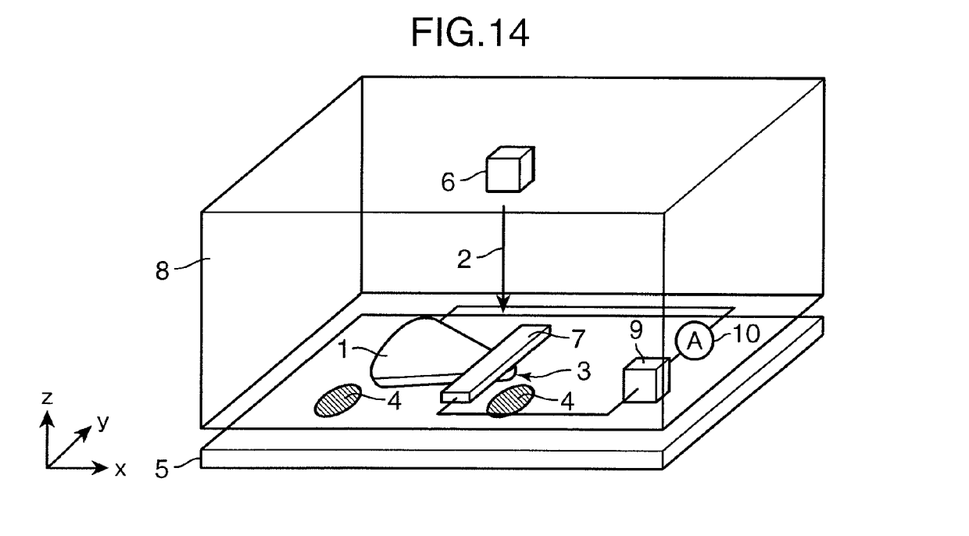
FIG. 14 is a perspective view showing a schematic construction of a reproducing head in which a photoelectric conversion element and a scatterer are connected in series as a circuit for detecting a change of electrical conductivity of the photoelectric conversion element.
Figure 15:
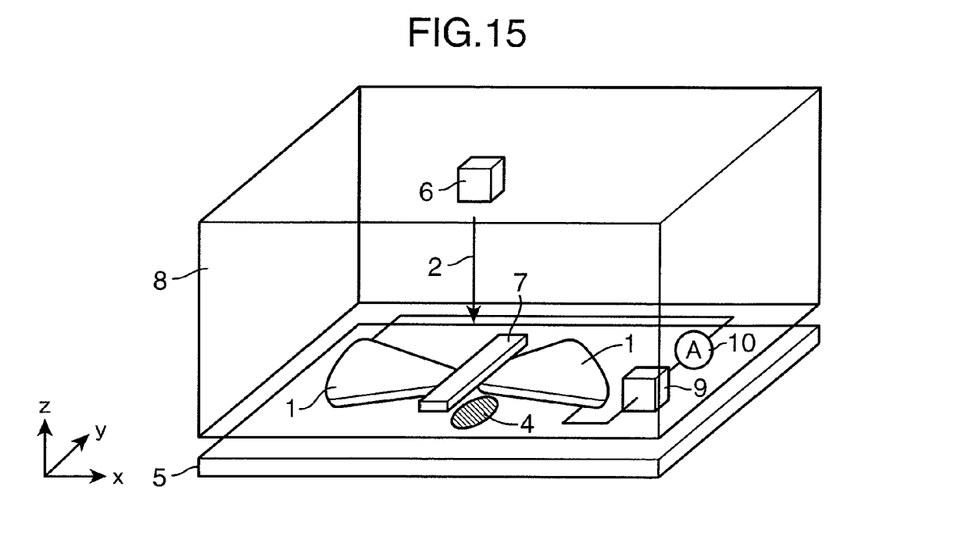
FIG. 15 is a perspective view showing a schematic construction of a reproducing head in which a photoelectric conversion element and two identically shaped scatterers at the opposite sides of the photoelectric conversion element are connected in series as a circuit for detecting a change of electrical conductivity of the photoelectric conversion element.

Although the both ends of the photoelectric conversion element 7 are wired for the application of the bias voltage in order to detect the electrical conductivity change of the photoelectric conversion element 7 in FIG. 1, the electrical conductivity change of the photoelectric conversion element 7 may be detected by connecting one wiring from the current detection element 10 with the scatterer 1 and the other wiring from the power supply 9 with one end of the photoelectric conversion element 7 to arrange the photoelectric conversion element 7 and the scatterer 1 in series as shown in FIG. 14. Further, in the case of combining a plurality of scatterers 1, e.g. in the case of using two scatterers 1, the electrical conductivity change of the photoelectric conversion element 7 may be detected by wiring the scatterers 1, i.e. connecting one wiring from the current detection element 10 with one scatterer 1 and the other wiring from the power supply 9 with the other scatterer 1 to arrange the one scatterer 1, the photoelectric conversion element 7 and the other scatterer 1 in series as shown in FIG. 15. In these modes, the scatterer(s) 1 can be used not only as near-field light generation source(s), but also electrode(s) of a circuit for detecting an electrical conductivity change, wherefore the construction of the optical head can be more simplified.

Since the scatterer 1 also functions as the electrode of the circuit for detecting the electrical conductivity change in the examples shown in FIGS. 14 and 15, the scatterer 1 may be so arranged as to be directly in contact with the photoelectric conversion element 7. Further, a clearance to permit the flow of a tunnel current may be formed between the scatterer 1 and the photoelectric conversion element 7. In this case, a current can flow from the scatterer 1 to the photoelectric conversion element 7 by the tunnel current with a small clearance formed between the scatterer 1 and the photoelectric conversion element 7, wherefore the scatterer 1 can also function as the electrode of the circuit for detecting the electrical conductivity change while strong near-field light is generated by the scatterer 1.

Figure 16:
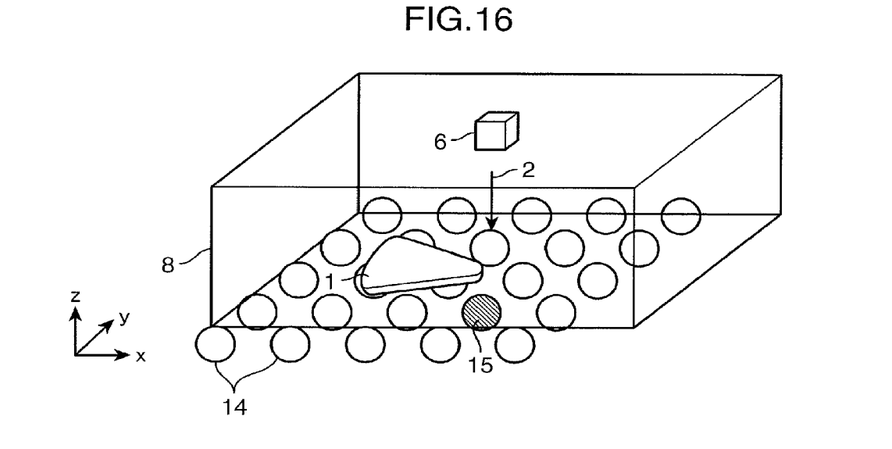
FIG. 16 is a perspective view showing a schematic construction of a reproducing head using a microparticulated recording medium.

The recording medium may not necessarily be an even film, but may be, for example, microparticulated recording mediums 14 arranged as shown in FIG. 16, wherein a recorded state of each microparticulated recording medium corresponds to 1 bit. By microparticulating the recording media in this way, heat generated upon the recording or reproduction can be prevented from spreading to a part other than a desired recording region or reproduction region. It can be also prevented that adjacent recorded part (recording mark 15 of the microparticulated recording medium) and unrecorded part (unrecorded microparticulated recording media 14) interact to lose recording information.

The material, shape and dimensions of the scatterer 1, the material and thickness of the recording medium 5 and the distance between the scatterer 1 and the recording medium 5 are sufficient to be in such a combination as to satisfy the plasmon resonance condition and are not particularly limited to the above examples.

The present invention is summarized as follows from the above respective embodiments. Specifically, a near-field light detection element according to the present invention is for reproducing information from an information recording medium, whose dielectric constant changes according to information to be recorded, using near-field light and comprises a light source; a conductive scatterer for generating near-field light upon being irradiated with light emitted from the light source; and a photoelectric conversion element arranged in a near-field light generation region near the scatterer, wherein the scatterer irradiates the information recording medium with the near-field light; and an intensity change of the near-field light generated by a change of the dielectric constant of the information recording medium is detected based on an electrical conductivity change of the photoelectric conversion element.

In this near-field light detection element, the information recording medium whose dielectric constant changes according to information to be recorded is irradiated with the near-field light, the photoelectric conversion element is arranged in the near-field light generation region near the scatterer and the intensity change of the near-field light generated due to a change of the dielectric constant of the information recording medium is detected based on the electrical conductivity change of the photoelectric conversion element. Thus, the photoelectric conversion element is directly exposed to the near-field light, whereby an output change of the near-field light can be directly detected and a high S/N ratio can be ensured at the time of reproduction.

The photoelectric conversion element is preferably arranged within 30 nm from the scatterer.

In this case, out of the light irradiated to the photoelectric conversion element, the intensity of the near-field light from the scatterer is highest and it can be prevented that light other than the near-field light, i.e. components of the incident light directly irradiated to the photoelectric conversion element and those of the incident light deviated from the scatterer and irradiated to something other than the scatterer (e.g. information recording medium) to be scattered become background light to reduce the S/N ratio at the time of reproduction.

The photoelectric conversion element preferably includes a semiconductor material whose electrical conductivity changes according to the intensity change of the near-field light.

In this case, the output change of the near-field light irradiated to the photoelectric conversion element can be electrically detected using the electrical conductivity change of the photoelectric conversion element.

Preferably, the photoelectric conversion element includes a material which is substantially transparent at the wavelength of the light emitted from the light source and is capable of absorbing the light emitted from the light source by a multiple photon absorption process.

In this case, since the electrical conductivity changes only in a part of the photoelectric conversion element where the light intensity is strong, a reduction of the S/N ratio at the time of reproduction caused by background light such as weak scattered light and reflected light can be prevented.

The photoelectric conversion element preferably includes any one of InSb, PbSe, PbTe, InAs, Ge, GaSb, Si, InP, GaAs, CdTe, AlSb, CdSe, GaP, CdS, ZnS, $Fe_2O_3$, $Cu_2O_3$, $In_2O_3$, $WO_3$, $Fe_2TiO_3$, PbO, $V_2O_5$, $FeTiO_3$, $Bi_2O_3$, $Nb_2O_3$, $TiO_2$, $SrTiO_3$, ZnO, $BaTiO_3$, $CaTiO_3$, $KTaO_3$, and $SnO_2$.

In this case, since the electrical conductivity changes only by the intensity change of the strong near-field light by the scatterer, it becomes insusceptible to components of the incident light directly incident on the photoelectric conversion element and background light such as weak scattered light and reflected light and a reduction of the S/N ratio at the time of reproduction can be prevented.

The scatterer is preferably made of a material whose dielectric constant at the wavelength of the light emitted from the light source has a negative real part.

In this case, in the construction in which the scatterer is carried by a transparent substrate, a dielectric body used as the transparent substrate generally has a positive real part of the dielectric constant at the wavelength of the light emitted from the light source. Plasmon resonance occurs at an interface between such a material and a material having a negative real part of the dielectric constant, wherefore the output of the near-field light can be increased and the information recording medium can be efficiently irradiated with the near-field light.

The scatterer preferably includes any one of Au, Ag, Al, Pt, Cu, Mo, Ni, Mg, and Ir. In this case, the real part of the dielectric constant is negative in a frequency band from visible light to infrared light and a semiconductor laser can be used as the light source.

The scatterer is preferably such that the width thereof is narrowed toward an apex where the near-field light is generated and the tip diameter thereof is shorter than the wavelength of the light emitted from the light source. In this case, since the apex for generating the near-field light can be sharply pointed, it is possible to form a near-field light spot equal to or below a diffraction limit and increase the output of the near-field light.

The scatterer is preferably an electrode for detecting the electrical conductivity change of the photoelectric conversion element. In this case, the structure of the optical head can be simplified more.

The material and dimensions of the scatterer, the wavelength of the light emitted from the light source and substances around the scatterer are preferably so set as to satisfy a plasmon resonance condition. In this case, stronger near-field light can be generated.

It is preferable that a recess is formed in a specified part of the scatterer other than the vicinity of the apex for generating the near-field light; and that the photoelectric conversion element is arranged in the recess.

In this case, the abrasion of the photoelectric conversion element can be prevented during the movement of the information recording medium, and the apex of the scatterer can be three-dimensionally sharply pointed to generate near-field light with a smaller spread.

It is preferable that a light shielding film arranged near the scatterer for absorbing the light emitted from the light source is further provided; and that a distance between the scatterer and the light shielding film or a distance between the photoelectric conversion element and the light shielding film is equal to or shorter than the wavelength of the light emitted from the light source.

In this case, reflected light from the information recording medium, which becomes background light leading to a reduction of the S/N ratio at the time of reproduction, can be reduced since it can be suppressed that the light emitted from the light source is directly irradiated to the information recording medium through an interval between the scatterer and the light shielding film or between the photoelectric conversion element and the light shielding film.

The light shielding film preferably includes any one of InSb, PbSe, PbTe, InAs, Ge, GaSb, Si, InP, GaAs, CdTe, AlSb, and CdSe.

In this case, reflected light from the information recording medium, which becomes background light leading to a reduction of the S/N ratio at the time of reproduction, can be sufficiently reduced since unnecessary propagation light can be absorbed.

An information recording medium reproducing method according to the present invention is for reproducing information from an information recording medium whose dielectric constant changes according to information to be recorded and comprises the steps of generating near-field light by irradiating a conductive scatterer with light while relatively moving the scatterer with respect to the information recording medium; and detecting an intensity change of the near-field light generated by a change of the dielectric constant of the information recording medium based on an electrical conductivity change of a photoelectric conversion element arranged in a near-field light generation region near the scatterer.

INDUSTRIAL APPLICABILITY

According to a near-field light detection element and an information reproducing method of the present invention, an intensity change of near-field light near a scatterer generated due to a difference in a relative positional relationship between the scatterer and a recording mark is directly detected based on an electrical conductivity change of a photoelectric conversion element. Thus, a high S/N ratio can be ensured at the time of reproduction. Further, a reproduction optical system becomes unnecessary, which largely contributes to a cost reduction of the near-field light detection element.

What is claimed is:

1. A near-field light detection element for reproducing information from an information recording medium, whose dielectric constant changes according to information to be recorded, using near-field light, comprising:
    a light source;
    a conductive scatterer for generating near-field light upon being irradiated with light emitted from the light source; and
    a photoelectric conversion element arranged in a near-field light generation region near the scatterer,
    wherein the scatterer irradiates the information recording medium with the near-field light, and
    wherein an intensity change of the near-field light generated by a change of the dielectric constant of the information recording medium is detected based on an electrical conductivity change of the photoelectric conversion element.

2. A near-field light detection element according to claim 1, wherein the photoelectric conversion element is arranged within 30 nm from the scatterer.

3. A near-field light detection element according to claim 1, wherein the photoelectric conversion element includes a semiconductor material whose electrical conductivity changes according to the intensity change of the near-field light.

4. A near-field light detection element according to claim 1, wherein the photoelectric conversion element includes a material which is substantially transparent at the wavelength of the light emitted from the light source and is capable of absorbing the light emitted from the light source by a multiple photon absorption process.

5. A near-field light detection element according to claim 1, wherein the photoelectric conversion element includes any one of InSb, PbSe, PbTe, InAs, Ge, GaSb, Si, InP, GaAs, CdTe, AlSb, CdSe, GaP, CdS, ZnS, $Fe_2O_3$, $Cu_2O_3$, $In_2O_3$, $WO_3$, $Fe_2TiO_3$, PbO, $V_2O_5$, $FeTiO_3$, $Bi_2O_3$, $Nb_2O_3$, $TiO_2$, $SrTiO_3$, ZnO, $BaTiO_3$, $CaTiO_3$, $KTaO_3$, and $SnO_2$.

6. A near-field light detection element according to claim 1, wherein the scatterer is made of a material whose dielectric constant at the wavelength of the light emitted from the light source has a negative real part.

7. A near-field light detection element according to claim 1, wherein the scatterer includes any one of Au, Ag, Al, Pt, Cu, Mo, Ni, Mg, and Ir.

8. A near-field light detection element according to claim 1, wherein the width of the scatterer is narrowed toward an apex where the near-field light is generated, and the tip diameter of the scatterer is shorter than the wavelength of the light emitted from the light source.

9. A near-field light detection element according to claim 1, wherein the scatterer is an electrode for detecting the electrical conductivity change of the photoelectric conversion element.

10. A near-field light detection element according to claim 1, wherein (i) the material and dimensions of the scatterer, (ii) the wavelength of the light emitted from the light source, and (iii) substances around the scatterer are so set as to satisfy a plasmon resonance condition.

11. A near-field light detection element according to claim 1,
    wherein a recess is formed in a specified part of the scatterer other than a vicinity of the apex for generating the near-field light, and
    wherein the photoelectric conversion element is arranged in the recess.

12. A near-field light detection element according to claim 1, further comprising a light shielding film arranged near the scatterer for absorbing the light emitted from the light source,
    wherein a distance between the scatterer and the light shielding film or a distance between the photoelectric conversion element and the light shielding film is equal to or shorter than the wavelength of the light emitted from the light source.

13. A near-field light detection element according to claim 12, wherein the light shielding film includes any one of InSb, PbSe, PbTe, InAs, Ge, GaSb, Si, InP, GaAs, CdTe, AlSb, and CdSe.

14. An information recording medium reproducing method for reproducing information from an information recording medium whose dielectric constant changes according to information to be recorded, the method comprising:
generating near-field light by irradiating a conductive scatterer with light while relatively moving the scatterer with respect to the information recording medium; and
detecting an intensity change of the near-field light generated by a change of the dielectric constant of the information recording medium based on an electrical conductivity change of a photoelectric conversion element arranged in a near-field light generation region near the scatterer.

* * * * *